US012703512B2

(12) United States Patent
Goehlich et al.

(10) Patent No.: US 12,703,512 B2
(45) Date of Patent: Aug. 11, 2026

(54) SYSTEM AND METHOD FOR INSPECTING A SURFACE OF AN AIRCRAFT OR SPACECRAFT

(71) Applicant: Airbus Operations GmbH, Hamburg (DE)

(72) Inventors: Robert Alexander Goehlich, Hamburg (DE); Clara Hauser, Hamburg (DE); Michel Bädker, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 370 days.

(21) Appl. No.: 18/501,209

(22) Filed: Nov. 3, 2023

(65) Prior Publication Data

US 2024/0174380 A1 May 30, 2024

(30) Foreign Application Priority Data

Nov. 30, 2022 (EP) .................................... 22210611

(51) Int. Cl.
*B64F 5/60* (2017.01)

(52) U.S. Cl.
CPC ..................................... *B64F 5/60* (2017.01)

(58) Field of Classification Search
CPC ........... B64F 5/60; G01B 11/25; G01B 21/16; G01B 5/0002; G01B 5/0025
See application file for complete search history.

(56) References Cited

U.S. PATENT DOCUMENTS

2013/0018525 A1* 1/2013 Jang ..................... G01N 29/265 701/2
2013/0333472 A1* 12/2013 Georgeson ......... G01N 29/2418 73/584

(Continued)

FOREIGN PATENT DOCUMENTS

CN 211055414 U 7/2020

OTHER PUBLICATIONS

European Search Report for corresponding European Patent Application No. 22210611 dated Apr. 27, 2023; priority document.

(Continued)

*Primary Examiner* — Kidest Worku
(74) *Attorney, Agent, or Firm* — Greer, Burns & Crain, Ltd.

(57) ABSTRACT

A system for checking an aircraft or spacecraft surface structure includes a ground vehicle having a drive, a manipulator arranged on the ground vehicle, having multiple movement links articulately arranged relative to one another, an inspection device arranged on the manipulator, proximity sensors, and a control unit. The proximity sensors are distributed on the manipulator, divided into multiple zones, and configured to acquire a distance to an object. The system inspects the surface structure by successively moving the inspection device along the surface structure. The control unit records distances acquired by the proximity sensors and activates the drive and the manipulator based on the acquired distances such that the inspection device is placed at successive inspection positions at a predetermined distance to the surface structure, and a sufficient distance of the ground vehicle and the manipulator from the surface structure and any objects surrounding the surface structure is maintained simultaneously.

19 Claims, 2 Drawing Sheets

(56) References Cited

U.S. PATENT DOCUMENTS

| | | | | |
|---|---|---|---|---|
| 2016/0264262 | A1* | 9/2016 | Colin | B25J 19/023 |
| 2018/0370027 | A1* | 12/2018 | Oota | G06F 18/217 |
| 2019/0022849 | A1* | 1/2019 | Akin | B25J 5/005 |
| 2019/0311469 | A1* | 10/2019 | Afrasiabi | G06T 7/001 |
| 2019/0311555 | A1* | 10/2019 | Troy | B25J 9/1697 |
| 2020/0206924 | A1* | 7/2020 | Pivac | G05B 19/4097 |

OTHER PUBLICATIONS

D. Wegerif, et al., "Whole Arm Proximity Control System for Articulated Robots Working Near Space Vehicles and Flight Hardware" Space Programs and Technologies Conference and Exhibit, retrieved from the Internet: http://dx.doi. org/10.2514.6.1993-4158>, Aug. 22, 1993.

* cited by examiner

SYSTEM AND METHOD FOR INSPECTING A SURFACE OF AN AIRCRAFT OR SPACECRAFT

CROSS-REFERENCES TO RELATED APPLICATIONS

This application claims the benefit of the European patent application No. 22210611.4 filed on Nov. 30, 2022, the entire disclosures of which are incorporated herein by way of reference.

FIELD OF THE INVENTION

The present description relates to a system and a method for checking a surface of an aircraft or spacecraft.

BACKGROUND OF THE INVENTION

A high surface quality is desired in the production of fuselage structures, for example for aircraft or spacecraft. If the fuselage includes rivet connections, for example, it is typical to check the quality of the rivet connections in a visual and/or tactile manner and to measure them at points using measuring tools. For this purpose, individual rivet connections are illuminated from the side and it is checked on the basis of a silhouette whether a rivet is seated too low or too high in a rivet hole or is noticeable in another way. Furthermore, it is typical to move the finger over a rivet head and/or to use a dial gauge to detect protruding or recessed edges.

In addition, devices for surface scanning are known, which use light projection and image acquisition technologies in order to examine surface sections for specific features. These devices are generally held in the hand and include a foam frame, which is placed on the surface section to be checked, followed by an optical acquisition of the area enclosed by the foam frame. If points having shape deviations are determined, information about them is stored. This takes place, in particular, in the form of image information in which the respective noticeable points are marked accordingly.

Such an inspection is time-consuming for the inspection of relatively long rivet rows on the fuselage of an aircraft or spacecraft, which comprise hundreds of rivet connections or more. Furthermore, the surface structure can also be checked for other anomalies, for example for dents or scratches.

SUMMARY OF THE INVENTION

One object of the invention can be considered that of proposing the simplest possible system and method, using which an inspection of a surface of an aircraft or spacecraft can be carried out in an automated manner as quickly and reliably as possible, wherein the integrity of the aircraft or spacecraft and the assembly environment surrounding it is protected from damage.

A system for checking a surface structure of an aircraft or spacecraft is proposed, including a ground vehicle having a drive, a manipulator, arranged on the ground vehicle, having multiple movement links arranged in an articulated manner in relation to one another, an inspection device arranged on the manipulator and movable by the manipulator, multiple proximity sensors, and a control unit, wherein the proximity sensors are distributed at least on the manipulator and are divided there into multiple zones and are designed to acquire a distance of the proximity sensor to an object in a respective acquisition range, wherein the drive and the proximity sensors are coupled to the control unit, wherein the inspection device is configured to determine a property of the surface structure and to identify points having a shape deviation by comparison to a setpoint property, wherein the system is designed to successively inspect the surface structure of the aircraft or spacecraft by successively moving the inspection device along the surface structure, and wherein the control unit is designed to record distances acquired by the proximity sensors, and to activate the drive and the manipulator in consideration of the acquired distances such that the inspection device is placed in succession at inspection positions at a predetermined distance to the surface structure and at the same time a sufficient distance of the ground vehicle and the manipulator from the surface structure and any objects surrounding the surface structure is maintained.

The ground vehicle is provided for moving the manipulator and the inspection device arranged thereon on a floor along the surface to be inspected at an assembly or construction site. It is conceivable that the ground vehicle is parked in another space and is driven from this space to the assembly or construction site. The ground vehicle could therefore preferably be designed to also cover relatively great distances, which could include a multiple of the extension of the surface to be examined. The ground vehicle could be embodied as compactly as possible and preferably autonomously. The ground vehicle could be embodied, for example, as a standardized, driverless transport vehicle (UGV, "unmanned ground vehicle"), which can be understood as a mobile robot. This type of transport device is known in the industrial environment and used, inter alia, to move pallets or other objects in an automated manner along floor lines or assisted by another navigation aid on the floor. The drive is preferably electric and the ground vehicle can include an electrical energy storage device, which is connectable to the drive and the further components.

The manipulator can include multiple movement links, which, for example, are rod-shaped in design and are connected to one another in an articulated manner. The joints are preferably actively rotatable in order to be able to move the movement links in relation to one another. The inspection device is provided as the end effector on the manipulator. The manipulator includes a first end, which is arranged on the ground vehicle. An opposite second end includes the end effector or the inspection device. For example, the manipulator can include one, two, three, four, or more movement links, which form a kinematic chain and are each connected via a joint to one of the other movement links or to the ground vehicle. It is preferred to make the movement links or the joints movable independently of one another, wherein the control unit is connected to all actuators in order to activate them and to move or align the inspection device as desired.

The inspection device can be implemented in different ways. Preferably, as explained at the outset, it can be embodied as an optical scanning device in order to check specific features contactlessly, in that it records and evaluates an image of a projected pattern of visible light. Such an inspection device is known and is typically used for the inspection of aircraft surface structures. However, mechanical scanning devices or scanning devices based on nonvisible light are also conceivable.

The proximity sensors are designed to acquire a distance to an object preferably contactlessly. Such a proximity sensor could be implemented, for example, as an ultrasonic sensor which emits ultrasonic signals and receives their reflections. Furthermore, inductive proximity sensors could be used for metallic objects. Capacitive proximity sensors or optical sensors are also conceivable, wherein the latter would be implementable by laser systems or camera systems. The proximity sensors each have a design-related acquisition range and an acquisition direction.

One core concept of the invention is to enable improved movement control and thus faster movement of the inspection device at a construction or assembly site. When driving the ground vehicle and/or the manipulator up to an object, not only is a stop signal generated by a proximity sensor which detects the relevant object. Instead, the entirety of the movements of the individual movement links and the ground vehicle are controlled so that further movement of the inspection device is also enabled during approach to the object in that the individual distances of the individual components of the ground vehicle and the manipulator are kept at a predetermined (minimum) value and only the mobility or the speed of individual components is restricted as needed. By way of a division into zones, multiple areas of the manipulator and the ground vehicle can be observed individually, in order to plan local restrictions of the movement. Intelligent, predictive movement control is thus enabled, which enables a rapid sequence of the approach of inspection positions even in the event of obstacles which are not previously known and accelerates the checking of the surface structure. The system can be used during production, during maintenance, and in ongoing operation, for example between two successive flights.

In one advantageous embodiment, the control unit is designed to move those elements of the manipulator which are located closer to an object or the surface structure than other elements at a lower speed than the other elements. An adaptive movement of the ground vehicle and the manipulator is therefore carried out in order to carry out a smooth sequence of checking the surface structure. Moving past obstacles or other objects accordingly takes place in such a way that areas on the ground vehicle or manipulator having the highest probability of collision, i.e., having the smallest distance to an obstacle or another object, are moved slowest. The activation by the control unit can take place so that movement sequences of the ground vehicle or the manipulator are planned so that a further approach to an object or an obstacle is prevented.

In one advantageous embodiment, the zones comprise an end effector zone, which adjoins the inspection device or in the area of which the inspection device is arranged, wherein the control unit is designed to assist the placement of the inspection device at one of the inspection positions from acquired distances of the proximity sensors in the end effector zone. A subset of the acquired distances is used to carry out precise positioning of the inspection device at the surface structure to be checked. Dedicated proximity sensors, which are provided exclusively for the positioning of the inspection device on the surface structure, are not necessary. However, it is also possible that in addition thereto, the inspection device itself could also be equipped with distance sensors, which permit positioning of the inspection device at the surface structure. The end effector zone could be present at a joint or adjoining a joint, at which the inspection device is arranged. It is conceivable that the acquisition ranges of the proximity sensors arranged in the end effector zone are at least partially adapted to the alignment of the inspection device.

In one advantageous embodiment, the control unit is designed to plan a movement path of the inspection device to reach the inspection positions, wherein the acquired distances of the proximity sensors are weighted differently. The planned movement path could, in particular, be made dependent on the smaller acquired distances, for example by stronger weighting. Maintaining a minimum distance of all components of the system to an obstacle or another object can thus be assisted.

In one advantageous embodiment, the control unit is designed to use at least one model for machine learning in order to plan the movement path for the ground vehicle and/or the manipulator, wherein the movement path is derived at least partially on the basis of a value function, which comprises the acquired distances and therefrom describes collision probabilities between the ground vehicle or the manipulator and the surface structure and other objects, and wherein the movement path comprises a sequence of movement procedures of the ground vehicle and/or the manipulator. The sequence of movement procedures could, in particular, relate to the entirety of all partial movements of all actuators of the manipulator or the drive of the ground vehicle which are used to place the inspection device at the inspection positions. The machine learning enables the system to learn the properties of the surroundings for the construction or assembly site by repeatedly checking surface structures of aircraft or spacecraft and to adaptively match the movement of the ground vehicle and the manipulator thereto. The efficiency of the system can thus be continuously increased and a possible speed of the checking can be increased. The control unit can feed the acquired distances into the machine learning algorithm in order to analyze them. Since algorithms for machine learning are of a probabilistic nature, the control unit can be capable of determining at least one statistical feature from the acquired distances and of computing at least one state indicator from the at least one statistical feature, which is then used for assessing the probabilities of various undesired states, i.e., a collision with the surface to be checked, equipment of the assembly or construction site, the system itself, another equivalent system, if several thereof are used, a human, or the like, which are presented to the algorithm for machine learning during the training. The detection of an undesired state can then be interpreted as exceeding a previously established limiting probability.

In one advantageous embodiment, the control unit is designed to activate the proximity sensors sequentially to avoid mutual influencing. This can relate, for example, to the sequential activation of proximity sensors, the acquisition ranges of which partially overlap. The accuracy of the acquisition of distances is significantly increased by avoiding mutual influencing. If, for example, multiple proximity sensors are distributed on the movement links of the manipulator, which have acquisition ranges which are oriented radially outward and span a plane transverse to the relevant movement link, it could be reasonable to always only activate proximity sensors opposite to one another instead of those adjacent to one another simultaneously.

In one advantageous embodiment, the manipulator is a robot arm which is connected via a base joint to the ground vehicle, wherein the movement links are elongated arm links, and wherein the manipulator comprises an end effector joint, on which the inspection device is arranged. The base joint and/or the end effector joint is rotatable in each case at least around two axes and permits a high level of mobility of the inspection device, in order to place the inspection device at a desired inspection position depending on the position of the ground vehicle and simultaneously to align it in a desired manner.

In one advantageous embodiment, the manipulator comprises a network made up of electrical connection lines, which extends at least in some areas on a surface of the manipulator, wherein the proximity sensors are arranged on the surface of the manipulator and are connectable to the network. The proximity sensors can thus easily be exchanged, removed, or retrofitted. Depending on the type and embodiment of the manipulator, it could be advisable to perform specific modifications in order to enable improved movement planning. The network could extend over a substantial part of the manipulator and permits very flexible equipping of the manipulator with proximity sensors.

In one advantageous embodiment, the connection lines are designed to provide an electrical supply voltage for the proximity sensors, wherein the proximity sensors are designed to communicate wirelessly with the control unit. The network can therefore be designed very simply and can be restricted solely to the distribution of two voltage poles on the surface. Individual proximity sensors could solely be stuck onto the surface of the manipulator in order to be supplied with a voltage there.

In one advantageous embodiment, the system is designed to mark an identified point having a shape deviation by means of a removable marking. The marking could include a removable paint, using which the shape deviation is circled. A sticker, which is optionally printed with a barcode or a QR code and permits further information to be provided, could be stuck on, at, or adjacent to the shape deviation. Attaching an RFID tag is also conceivable.

The system is preferably designed to generate data which represent the surface to be scanned and/or at least determined anomalies of the surface structure. For this purpose, the system is capable of exactly establishing a position of the respective anomaly, for example by way of a positioning system installed at the assembly or construction site, which enables a position determination, for example by a marking grid on the floor or the surface structure, a laser system, or the like.

The invention furthermore relates to a method for checking a surface structure of an aircraft or spacecraft, comprising the steps of providing at least one ground vehicle having a drive, a manipulator, arranged on the ground vehicle, having multiple movement links arranged in an articulated manner in relation to one another, an inspection device arranged on the manipulator and movable by the manipulator, and multiple proximity sensors, which are distributed at least on the manipulator and are divided there into multiple zones and are designed to acquire a distance of the proximity sensor to an object in a respective acquisition range; and successively moving the inspection device along the surface structure by activation using a control unit, and identifying points having a shape deviation by determining a property of the surface structure and comparing it to a setpoint property, wherein the activation comprises recording distances acquired by the proximity sensors and controlling the drive and the manipulator in consideration of the acquired distances, so that the inspection device is placed in succession at inspection positions at a predetermined distance to the surface structure and at the same time a sufficient distance of the ground vehicle and the manipulator from the surface structure and any objects surrounding the surface structure is maintained.

In one advantageous embodiment, the control unit activates those elements of the manipulator which are located closer to an object or the surface structure such that they move at a lower speed than other elements.

In one advantageous embodiment, the control unit plans a movement path of the inspection device to reach the inspection positions, wherein the acquired distances of the proximity sensors are weighted differently.

In one advantageous embodiment, the control unit uses at least one model for machine learning in order to plan the movement path for the ground vehicle and/or the manipulator, wherein the movement path is derived at least partially on the basis of a value function which comprises the acquired distances and describes collision probabilities therefrom, and wherein the movement path comprises a sequence of movement procedures of the ground vehicle and/or the manipulator.

The system according to the invention and the method according to the invention are fundamentally designed to check the surface structure simultaneously at multiple sections. Multiple systems, i.e., multiple ground vehicles having manipulators arranged thereon and inspection devices, can be used for this purpose. The respective control unit is capable due to the large number of the proximity sensors of also preventing a collision of one system with another system.

It is fundamentally conceivable that the control units of the multiple systems can be coupled to one another in order to mutually transmit the positions of the individual ground vehicles and manipulators in order to prevent a collision predictively.

At the same time, it is conceivable that acquired distances of one of the systems having a corresponding position specification of the relevant system acquiring the distances are also transmitted to control units of other systems, so that predictive planning of movement procedures is enabled.

In one advantageous embodiment of the method, multiple ground vehicles having one or more manipulators arranged thereon and one or more inspection devices, or at least one ground vehicle and at least one other device bearing a manipulator and an inspection device and including a control unit, could therefore jointly check multiple sections of the surface structure, wherein the control units can be coupled to one another in order to communicate position specifications of the respective ground vehicle or the other device and/or the respective manipulator and/or the respective inspection device, and/or to communicate respectively acquired distances having position specifications of the respective ground vehicle or the other device and/or the respective manipulator and/or the respective inspection device. The "other device" could also be understood as a vehicle which is not necessarily ground-based and is movable, for example, on a cable, a rail arranged above the ground, or via flotation means along the surface structure.

BRIEF DESCRIPTION OF THE DRAWINGS

Exemplary embodiments will be described in more detail hereinafter on the basis of the appended drawings. The illustrations are schematic and are not to scale. Identical reference signs relate to identical or similar elements. In the figures.

DETAILED DESCRIPTION OF THE PREFERRED EMBODIMENTS

Figure 1:
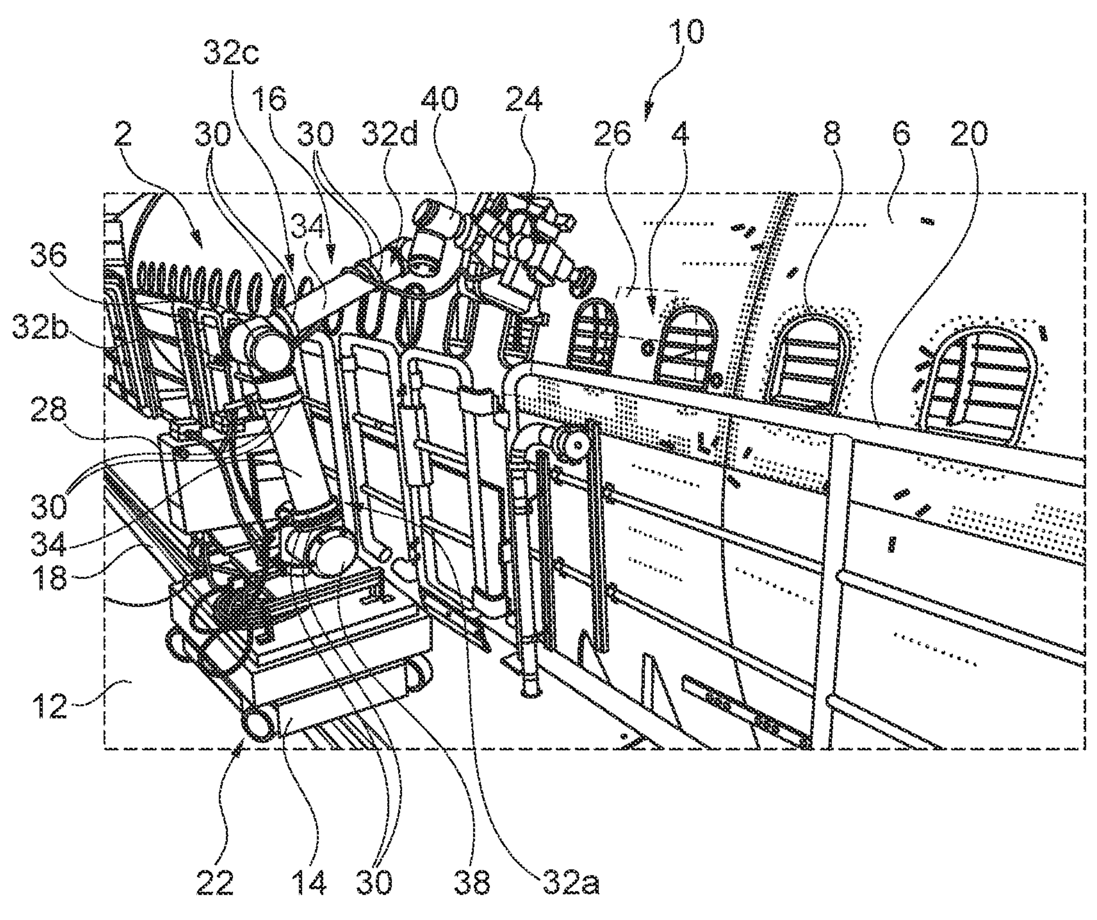
FIG. 1 shows a schematic illustration of a system according to one exemplary embodiment during the scanning of a surface of an aircraft.

FIG. 1 shows a system 2 for checking a surface structure 4 of an aircraft 6. The surface structure 4 comprises, for example, rivet rows on a fuselage surface, for example between, above, or below windows 8. The area shown in FIG. 1 is to be understood solely by way of example for illustration and not as a restriction. The aircraft 6 is arranged at an assembly or construction site 10, wherein a floor 12 is provided there which extends along the surface structure 4. A ground vehicle 14, on which a manipulator 16 is arranged, associated with the system 2 is located there.

The ground vehicle 14 is embodied, for example, as a standardized, driverless transport vehicle (UGV, "unmanned ground vehicle") and can preferably move autonomously on the floor 12. A floor rail 18, which extends linearly along the surface structure 4 in or on the floor 12, is provided here for mechanical or optical guiding on a lane. For delimitation of the floor 12 at the assembly or construction site 10 toward the aircraft 6, a railing 20 is provided, which could be formed irregularly depending on the equipment of the assembly or construction site 10. For example, doors for entering the fuselage of the aircraft 6 could occasionally be provided.

The ground vehicle 14 includes a drive 22 and can move along the floor 12. In this case, the surface structure 4 of the aircraft 6 is checked by means of an inspection device 24, which is arranged on the manipulator 16. The inspection device 24 is, in this case, a device which detects shape deviations in the surface structure 4. This is implemented in that a pattern of visible light is projected onto the surface structure at a predetermined distance to the surface structure 4 and a resulting image 26 is acquired and evaluated. Such inspection devices 24 are known for scanning surface structures, but are usually used in a hand-held manner.

As is apparent in FIG. 1, only small sections of the surface structure 4 are examined by the inspection device 24, so that inspection positions on the surface structure 4 have to be approached in succession in order to be able to acquire the relevant area of the surface structure 4 as a whole. The ground vehicle 14 includes a control unit 28 for this purpose, which is designed to record distances acquired by multiple proximity sensors 30 and to activate the drive 22 and the manipulator 16 in consideration of the acquired distances such that the inspection device 24 is placed in succession at inspection positions at a predetermined distance to the surface structure 4 and simultaneously a sufficient distance of the ground vehicle 14 and the manipulator 16 from the surface structure 4 and objects 20 surrounding the surface structure 4 is maintained.

Multiple proximity sensors 30 are provided here, which are distributed over the manipulator 16 and divided into multiple zones 32*a*, 32*b*, 32*c*, and 32*d*. The manipulator 16 includes, by way of example, two rod-shaped arm links 34, which are connected via a joint 36. The manipulator 16 is connected to the ground vehicle 14 via a base joint 38. An end effector joint 40 is arranged at a free end of the manipulator 16 and bears the inspection device 24. The proximity sensors 30 are arranged in circumferential rows on the arm links 34 and each have an acquisition range, which is oriented radially outward. This will be explained further hereinafter on the basis of FIGS. 3 and 4. The control unit 28 is coupled to the proximity sensors 30, the drive 22, and the manipulator 16.

Figure 2:
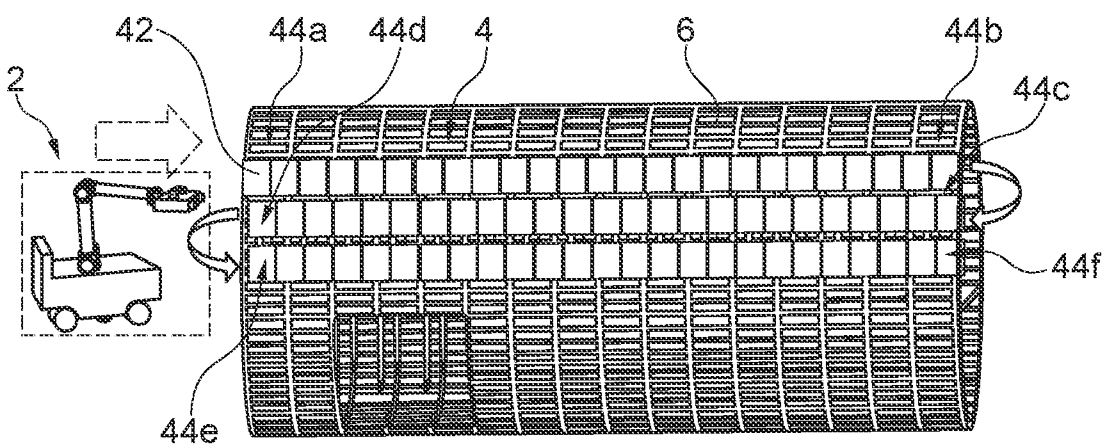
FIG. 2 shows a schematic illustration of a sequence of inspection procedures on the aircraft.

FIG. 2 shows the surface structure 4 of the aircraft 6 in a schematic partial view, with indicated system 2. Individual inspection positions 42 are shown here, which are traveled along in succession by the system 2 in order to check an area of interest of the surface structure 4 by local scanning of the surface structure 4 in succession. Three rows located one over another of inspection positions 42 are shown here solely by way of example, which are approached successively in order to carry out a local inspection there.

This can mean, for example, that the system 2 is moved along the entire area of the surface structure 4 three times at uniform height of the inspection device 24 in each case. The system 2 initially starts at a first starting position 44*a* and runs up to a first end position 44*b*. The inspection device 24 is then lowered somewhat in order to drive from a second starting position 44*c* lying below the first end position 44*b* to a second end position 44*d*, which is arranged below the first starting position 44*a*. The inspection device 24 is then lowered again in order to be moved from a third starting position 44*e* lying below the second end position 44*d* to a third end position 44*f*, which is located below the second starting position 44*c*. Of course, other sequences are possible and the inspection positions 42 could also be traveled along in columns.

During the entire movement of the system 2 on the floor 12, the proximity sensors 30 perceive their surroundings and transmit acquired distances to the control unit 28. This can take place in the form of measured variables which specify the distance directly. However, it is also conceivable that the control unit 28 is equipped with evaluation electronics, filters, and the like in order to convert abstract signals from the proximity sensors 30 into corresponding distance values. Due to the weighting of the distances acquired by all proximity sensors 30, the control unit 28 can carry out the activation of the drive 22 and the manipulator 16 in order to ensure in each case a minimum distance both to the surface structure 4 and to the surrounding objects 20. Damage to the inspection device 24 and the manipulator 16 and to the objects 20 and the surface structure 4 can thus be counteracted.

The control unit 28 is designed here, by way of example, to use at least one model for machine learning in order to plan the movement path for the ground vehicle 14 and/or the manipulator 16. The movement path can be derived at least partially on the basis of a value function, which comprises the acquired distances and describes collision probabilities therefrom.

Figure 3:
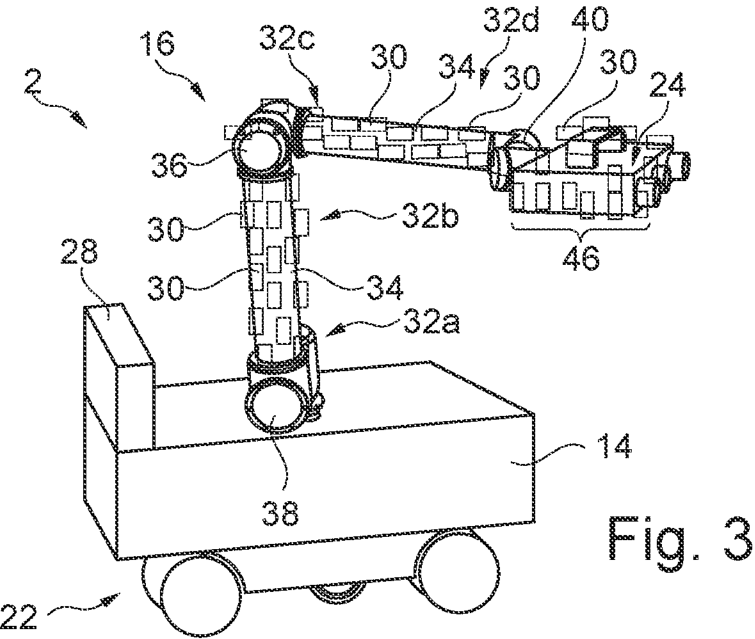
FIG. 3 shows the system in a schematic view.

FIG. 3 shows the system 2 once again, wherein a plurality of individual proximity sensors 30 is provided. These could, for example, also protrude at or beyond the inspection device 24 and form an end effector zone 46 there. This could assist the control unit 28 here in placing the inspection device 24 precisely at the desired distance at the surface structure 4.

Figure 4:
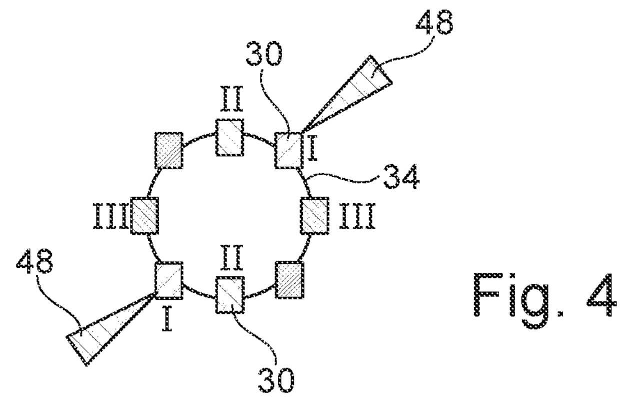
FIG. 4 shows a schematic view of proximity sensors distributed over a circumference of an arm link.

FIG. 4 very schematically shows an arm link 34 in a sectional illustration. Six proximity sensors 30 are distributed here, by way of example, in a common plane around the circumference of the arm link and each have an acquisition range 48. This range is oriented radially outward in a cone shape in each case, for example. Due to the dense arrangement of the proximity sensors 30, it is advisable to activate them sequentially in such a way that they do not mutually influence one another.

Three pairs I, II, and III of proximity sensors 30, which each consist of two proximity sensors 30 located diametrically opposite to one another, are shown, by way of example, on the basis of FIG. 4. These three pairs I, II, and III are activated in succession, by way of example, in order to each be able to acquire two distances in succession. It is thus ensured that the acquisition ranges 48 do not overlap.

Figure 5:
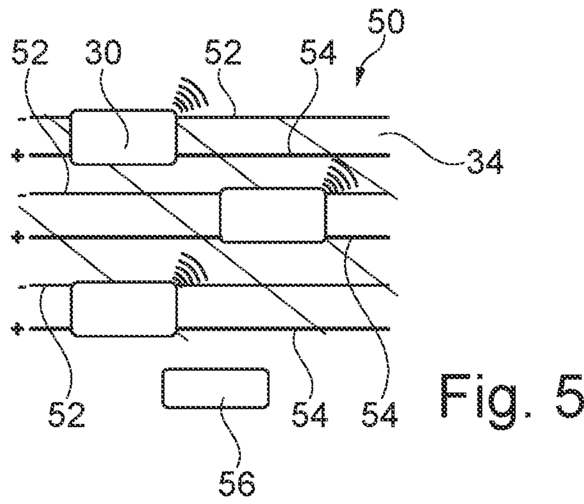
FIG. 5 shows a schematic illustration of a network of connection lines.

Finally, FIG. 5 shows a detail of a surface of an arm link 34, on which a network 50 of electrical connection lines 52 and 54 is provided. First connection lines 52 are connected here, by way of example, to a negative voltage pole, while second connection lines 54 are each connected to a positive voltage pole. These follow one another multiple times and in alternating sequence and in this way form the network 50. Individual proximity sensors 30 may each be arranged on a pair of two connection lines 52 and 54 in order to be supplied with a voltage.

It is conceivable that the proximity sensors 30 then communicate wirelessly with the control unit 28. This can take place directly or with the aid of a router 56. The manipulator 16 and possibly also the ground vehicle 14 may thus be equipped particularly easily and flexibly with proximity sensors 30. The placement thereof can optionally be modified. In particular, upon the use of a machine learning algorithm, the system 2 is capable of also detecting rearranged proximity sensors 30 and adapting the control accordingly thereto.

The systems and devices described herein may include a controller, such as control unit 28 or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

2 system
4 surface structure
6 aircraft
8 window
10 assembly or construction site
12 floor
14 ground vehicle
16 manipulator
18 floor rail
20 railing/object
22 drive
24 inspection device
26 image
28 control unit
30 proximity sensor
32 zone
34 arm link
36 joint
38 base joint
40 end effector joint
42 inspection position
44 starting position/end position
46 end effector zone
48 acquisition range
50 network
52 connection line
54 connection line
56 router
I, II, III pairs of proximity sensors

The invention claimed is:

1. A system for inspecting a surface structure of an aircraft or spacecraft, comprising:

a ground vehicle having a drive, a manipulator, arranged on the ground vehicle, having multiple movement links arranged in an articulated manner in relation to one another, an inspection device arranged on the manipulator and movable by the manipulator, multiple proximity sensors, and a control unit, wherein the proximity sensors are distributed at least on the manipulator and are divided there into multiple zones and are configured to acquire a distance of the proximity sensor to an object in a respective acquisition range, wherein the drive and the proximity sensors are coupled to the control unit, wherein the inspection device is configured to determine a property of the surface structure and to identify points having a shape deviation by comparison to a setpoint property, wherein the control unit is configured to successively inspect the surface structure of the aircraft or spacecraft by successively moving the inspection device along the surface structure, wherein the control unit is configured to record distances acquired by the proximity sensors and to activate the drive and the manipulator in consideration of the acquired distances such that the inspection device is placed in succession at inspection positions at a predetermined distance to the surface structure and such that simultaneous clearance is maintained for the inspection device, each movement link of the manipulator, and the ground vehicle from the surface structure and any objects surrounding the surface structure at the same time, wherein the proximity sensors are arranged circumferentially on multiple movement links of the manipulator and divided into a plurality of zones corresponding to different manipulator regions, and wherein the control unit weights distances acquired from different zones as a function of the respective detected distances to simultaneously maintain a minimum distance between each manipulator region and surrounding objects during movement.

2. The system as claimed in claim 1, wherein the control unit is configured to move components of the manipulator which are located closer to an object or the surface structure than different components at a lower speed than a speed of the different components.

3. The system as claimed in claim 1, wherein the zones comprise an end effector zone, which adjoins the inspection device or in an area of which the inspection device is arranged, wherein the control unit is configured to assist a placement of the inspection device at one of the inspection positions from acquired distances of the proximity sensors in the end effector zone.

4. The system as claimed in claim 1, wherein the control unit is configured to plan a movement path of the inspection device to reach the inspection positions.

5. The system as claimed in claim 4, wherein the control unit is configured to use at least one model for machine learning in order to plan the movement path for at least one of the ground vehicle or the manipulator, wherein the movement path is derived at least partially based on a value function, which comprises the acquired distances and describes collision probabilities between the ground vehicle or the manipulator and the surface structure and other objects therefrom, and wherein the movement path comprises a sequence of movement procedures of at least one of the ground vehicle or the manipulator.

6. The system as claimed in claim 1, wherein the control unit is configured to activate the proximity sensors sequentially to avoid mutual influencing.

7. The system as claimed in claim 1, wherein the manipulator is a robot arm, which is connected via a base joint to the ground vehicle, wherein the movement links are elongated arm links, and wherein the manipulator comprises an end effector joint, at which the inspection device is arranged.

8. The system as claimed in claim 1, wherein the manipulator comprises a network made up of electrical connection lines, which extends at least in some areas on a surface of the manipulator, and wherein the proximity sensors are arranged on the surface of the manipulator and are connectable to the network.

9. The system as claimed in claim 8, wherein the connection lines are configured to provide an electrical supply voltage for the proximity sensors, and wherein the proximity sensors are configured to communicate wirelessly with the control unit.

10. The system as claimed in claim 1, wherein the system is configured to mark an identified point having a shape deviation by means of a removable marking.

11. The system as claimed in claim 1, wherein the proximity sensors are activated sequentially in pairs of the proximity sensors located diametrically opposite one another on one of the multiple movement links.

12. The system as claimed in claim 1, wherein each of the proximity sensors has an acquisition range oriented radially outward from the respective movement link.

13. A method for checking-inspecting a surface structure of an aircraft or spacecraft, comprising the following steps:

providing at least one ground vehicle having a drive, a manipulator, arranged on the ground vehicle, having multiple movement links arranged in an articulated manner in relation to one another, an inspection device arranged on the manipulator and movable by the manipulator, and multiple proximity sensors, which are distributed at least on the manipulator and are divided there into multiple zones and are designed to acquire a distance of the proximity sensor to an object in a respective acquisition range, and successively inspecting the surface structure by successively moving the inspection device along the surface structure by activation using a control unit, and identifying points having a shape deviation by determining a property of the surface structure and comparing it to a setpoint property, wherein the activation comprises recording distances acquired by the proximity sensors and controlling the drive and the manipulator in consideration of the acquired distances, so that the inspection device is placed in succession at inspection positions at a predetermined distance to the surface structure and such that simultaneous clearance is maintained for the inspection device, each movement link of the manipulator, and the ground vehicle from the surface structure and any objects surrounding the surface structure at the same time, wherein the proximity sensors are arranged circumferentially on multiple movement links of the manipulator and divided into a plurality of zones corresponding to different manipulator regions, and wherein distances acquired from different zones are weighted as a function of respective detected distances to simultaneously maintain a minimum distance between each manipulator region and surrounding objects during movement.

14. The method as claimed in claim 13, wherein the control unit activates components of the manipulator which are located closer to an object or the surface structure such that they move at a lower speed than a speed of different components.

15. The method as claimed in claim 13, wherein the control unit is configured to plan a movement path of the inspection device to reach the inspection positions.

16. The method as claimed in claim 15, wherein the control unit uses at least one model for machine learning in order to plan the movement path for at least one of the ground vehicle or the manipulator, wherein the movement path is derived at least partially based on a value function, which comprises the acquired distances and describes collision probabilities therefrom, and wherein the movement path comprises a sequence of movement procedures of at least one of the ground vehicle or the manipulator.

17. The method as claimed in claim 13, wherein multiple ground vehicles having a manipulator arranged thereon and an inspection device, or at least one such ground vehicle and at least one other device bearing a manipulator and an inspection device, and each vehicle or device including a control unit configured to jointly check multiple sections of the surface structure, and wherein the control units are configured to be coupled to one another in order to communicate at least one of:

position specifications of at least one of a respective ground vehicles, the other device, a respective manipulator, or a respective inspection device, or respectively acquired distances having position specifications of the respective ground vehicle, the other device, the respective manipulator, or the respective inspection device.

18. The method as claimed in claim 13, wherein the proximity sensors are activated sequentially in pairs of the proximity sensors located diametrically opposite one another on one of the multiple movement links.

19. The method as claimed in claim 13, wherein each of the proximity sensors has an acquisition range oriented radially outward from the respective movement link.

* * * * *